United States Patent

Busch

[11] 4,198,255
[45] Apr. 15, 1980

[54] METHOD OF MAKING A MULTI ORIFICE STRUCTURE

[75] Inventor: Garland E. Busch, Milan, Mich.

[73] Assignee: The Bendix Corporation, Southfield, Mich.

[21] Appl. No.: 905,500

[22] Filed: May 12, 1978

Related U.S. Application Data

[62] Division of Ser. No. 796,953, May 16, 1977, Pat. No. 4,127,234.

[51] Int. Cl.² .................... B05B 1/14; B29C 17/02
[52] U.S. Cl. .................... 156/172; 29/157 C; 65/4 A; 156/250; 156/296; 156/182; 156/308.2; 239/558; 228/131
[58] Field of Search .............. 156/155, 250, 296, 306, 156/309, 172; 264/174; 29/157 C, 419 R, 423; 239/558; 431/99; 65/4 A

[56] References Cited

U.S. PATENT DOCUMENTS

| | | | |
|---|---|---|---|
| 3,602,620 | 8/1971 | Fassler | 431/99 |
| 3,713,202 | 1/1973 | Roberts et al. | 29/157 C |
| 3,737,367 | 6/1973 | Roberts et al. | 156/296 |
| 3,808,078 | 4/1974 | Snellman et al. | 156/172 |
| 3,825,460 | 7/1974 | Yoshikawa et al. | 156/296 |
| 3,919,764 | 11/1975 | Berhezan | 29/419 R |
| 4,080,700 | 3/1978 | Muller | 29/157 C |
| 4,109,870 | 8/1978 | Wolber | 239/558 |
| 4,127,398 | 11/1978 | Singer | 156/296 |

*Primary Examiner*—Jerome W. Massie
*Attorney, Agent, or Firm*—James R. Ignatowski; William F. Thornton

[57] ABSTRACT

The invention is a multiorifice structure and method of manufacuture. The structure comprises a plurality of triangularly shaped orifices angularly disposed with respect to a common axis. The structure is formed by fusing together concentric alternating layers of cylindrical members and parallel rods angularly disposed with respect to the axis of the cylindrical members. The fused structure is sliced generally normal to its axis to produce a plurality of multiorifice wafers or discs. The interstices between the rods and the cylindrical members form a plurality of small triangularly shaped orifices particularly well suited to use as an atomizer for an internal combustion engine fuel injector valve.

5 Claims, 6 Drawing Figures

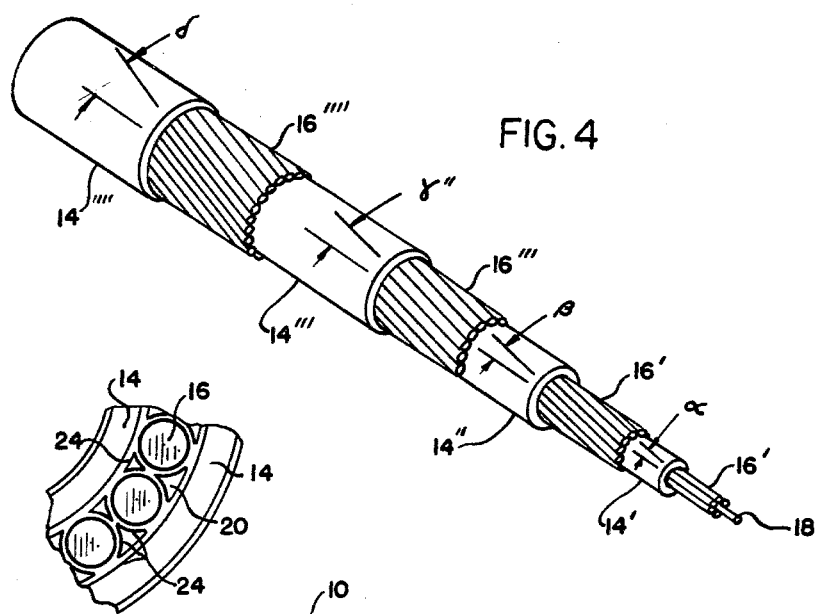
FIG. 4
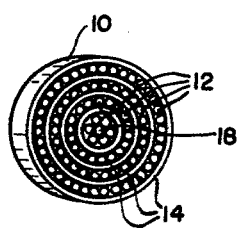
FIG. 5
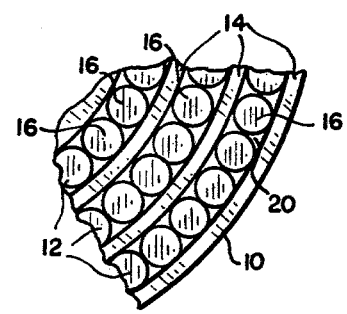
FIG. 3
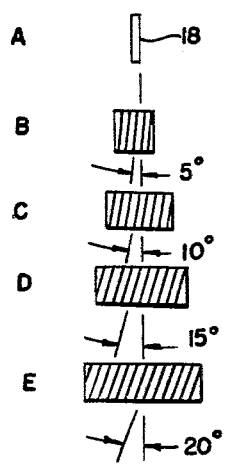
FIG. 2
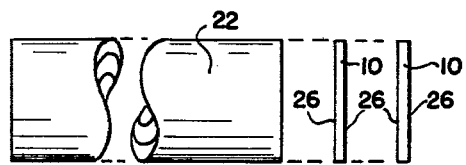
FIG. 6
FIG. 1

METHOD OF MAKING A MULTI ORIFICE STRUCTURE

This is a division of application Ser. No. 796,953, filed May 16, 1977, now U.S. Pat. No. 4,127,234.

BACKGROUND OF THE INVENTION

1. Field of the Invention

The invention related to multiorifice structures and a method of fabrication and, more particularly, to a multiorifice structure spray disc for use in conjunction with an automotive type fuel injector valve for atomizing the fuel being injected into an internal combustion engine.

2. Prior Arts

The use of multiorifice structures in connection with nozzles for dispersing or atomizing an exiting fluid is well known in the art. Such multiorifice structures are found in a wide variety of applications ranging from old fashion sprinkling cans for watering a garden to sophisticated fuel injector valves for internal combustion engines. Whether the multiorifice structure merely disperses the fluid as with the sprinkling can or atomizes the fluid as in the fuel injector nozzle application depends upon several factors, one of which is the size of the apertures, as well as force with which the fluid is ejected. Atomization is best accomplished when fluid is ejected from relatively small apertures with relatively high forces. For automotive fuel injector applications, small apertures having effective diameters in the range from several hundred to less than one hundred microns appear to give the desired atomization without the need of having the fuel pressurized above tolerable limits. Unfortunately, multiorifice structures having apertures in ths size range are difficult to manufacture and their cost is prohibitive to meet the high volume, low cost needs for the automotive market.

Various techniques for making the desired multiorifice structure, such as drilling or punching, are impractical. Photoetching or chemical machining appear as a better approach but due to the depth of the apertures required, the desired uniformity of the apertures is difficult to achieve. Alternatively, the fusion of small diameter tubes disclosed by Roberts et al in U.S. Pat. No. 3,737,367 (June 1973) appears as the best approach taught by the prior art. The disadvantage of this approach is that the resultant aperture passages are parallel to each other and therefore the spray cone of the emitted fuel is limited. The divergence of the spray pattern emitted by the Roberts type structure can be increased by coining the structure to produce a curved surface. Alternatively, the parallel tubes in various sections of the structure may be angularly disposed as taught by Roberts et al in U.S. Pat. No. 3,713,202 (January 1973).

Atomization may also be obtained by twisting the individual rows of tubes, as taught by A. L. R. Ellis in U.S. Pat. No. 1,721,381 (June 1929). In this patent the alterante rows are twisted in the opposite direction to incease the turbulance thereby enhancing the mixing and combustion of the emitted gases. Ellis further teaches the use of the interstices between the tubes to pass the oxidizing gas which supports the combustion of the fuel gas passing through the tubes. E. E. Fassler in U.S. Pat. No. 3,602,620 (August 1971) teaches a thermal lance in which the oxidizing gas is fed to the tip of the lance through the interstices formed by twisting solid wires about a core. The twisted rods in this patent provide a tortuous path to impede the gas flow.

SUMMARY OF THE INVENTION

The invention is a multiorifice wafer structure having a plurality of angularly disposed passages and a method for making the multiorifice structure.

The structure is made by fusing concentric layers of solid rods interspaced with cylindrically shaped members wherein each successive layer of rods is disposed at a progressively larger angle with respect to the axis of the fused assembly. The fused assembly of cylinders and rods is then cut into relatively thin wafers wherein the interstices formed between the fused layers of rods and the cylindrical members form a plurality of angularly disposed passageways in which angles of the passageways increase progressively as a function of their distance from the center of the structure. The thickness of the wafer is determined by the effective aperture of the interstices and is sufficient to impart to the fluid passing through the interstices a directional component parallel to the angular displacement of the rods with respect to the common axis of the structure.

The object of the invention is a multiorifice structure having a plurality of passageways angularly disposed with respect to a common axis.

Another object of the invention is a multiorifice structure in which the angular displacement of the passageways increases as a function of the displacement of the passageway from the center of the structure.

Another object of the invention is a flat multiorifice spray plate for a fuel injector valve in which the fuel passing through the spray plate is ejected at an angle which is a function of orifices distance from the center of the structure.

Still another object is a method for making a multiorifice structure which comprises fusing concentric layers of alternating cylindrical members and angularly disposed rods into an integral assembly, and slicing such integral assembly in a direction normal to the axis of said cylindrical members to produce a plurality fo multiorifice structures wherein the interstices between said rods and cylinders form a plurality of angularly disposed passageways.

These and other advantages of the invention will become apparent from a reading of the following detailed description in conjunction with the drawings.

BRIEF DESCRIPTION OF THE DRAWINGS

FIG. 1 is a perspective of the disclosed multiorifice structure.

FIG. 2 is an exploded side view showing the angular disposition of the sequential layers of rods.

FIG. 3 is an enlarged section of the multiorifice structure.

FIG. 4 is an exploded view illustrating the structure of the internal layers of a composite assembly.

FIG. 5 is an enlarged partial section showing a structure fabricated from coated rods and coated cylindrical members.

FIG. 6 is a side view of a fused composite and the resultant multiorifice structures cut therefrom.

DETAILED DESCRIPTION OF THE INVENTION

An exemplary embodiment of the invention is illustrated in FIG. 1. The multiorifice structure, designated generally by the numeral 10, is a wafer comprising alternating concentric layers of solid rods 12 and cylindrical members 14 fused or sintered into an integral assembly. Each layer of rods 12 comprises a plurality of individual rods 16 angularly disposed with respect to the axis of the concentric cylindrical members. In the preferreed embodiment, each concentric layer of rods 12, starting from the center of the structure is disposed a greater angle with respect to a core rod 18 than the preceding layer as illustrated in FIG. 2. In FIG. 2, Row A designates the core rod 18 which is axially disposed with respect to the wafer. Row B is a side view of just the first or innermost layer of rods 16. Row C designates the next sequential layer of rods and Rows D and E represent the next sequential layers of rods. It is to be understood that only four layers of rods are used to illustrate the concept, and that in actual practice the structure may have from two or three layers to well over 100 layers. Further, the angles at which the rods 16 are disposed with reference to the core rod 18 may be different than the angles shown. The angles shown are illustrative and the actual angular disposition of each layer or rods with respect to the axis of the multiorifice structure depends ultimately on the end use of the structure including the desired dispersion angle or spray cone of the fluid emitted from the structure. As is obvious, increasing the angular displacement of the rods will increase the resultant dispersion capabilities of the structure.

Referring now to FIG. 3, there is shown an enlarged section of a portion of the multiorifice structure. As previously described, the structure comprises a plurality of layers 12 of rods 16 separated by cylindrical members 14. The interstices or interstitial spaces 20 between the individual rods 16 and the cylindrical members 14 form a plurality of generally triangularly shaped passageways through the structure. These interstices 20 constitute the orifices through which the fluid to be dispersed or atomized flows.

The thickness of the structure is a function of the effective aperture of the interstices and is selected such that the fluid passing therethrough will, upon exiting the structure, have a directional component parallel to the axis of the interstices. Normally, the thickness of the multiorifice structure will be about 10 or more times the size of the individual orifices.

One advantage of the disclosed structure is that the triangular shaped orifices are more effective in the atomization of the exiting fluid than the circular orifices of the prior art. As is well known, surface tension forces acting on the exiting fluid tend to cause the exiting fluid stream to oscillate which eventually cause the exiting stream of fluid to break up in small droplets. The greater the distortion of the exiting stream from the natural spherical configuration of a free fluid, the greater will be the surface tension forces acting on the exiting fluid. As a result, the exiting fluid will be caused to vibrate more vigorously and break up into smaller particles than would be achieved with circular orifices having the same effective aperture.

Another factor to be considered is the overall uniformity of the apertures formed by this method over conventional drilling and/or photoetching techniques. The rods 16 are normally made by extruding techniques which result in very precise tolerances on its diameter, therefore, the triangular apertures resulting from the disclosed configuration will have a very uniform size.

FIGS. 4 and 5 illustrate a very simple and economical method for fabricating the disclosed multiorifice structure. Referring to FIG. 4, a central or core rod 18 is circumscribed by six or more rods or wires 16'. The first layer of rods 16' are twisted about the core and rod 18, so that their axis are disposed at a predetermined angle with respect to the axis of core rod 18. The angle α may be 5° as indicated in FIG. 2-B or any other desired angle. Core rod 18 and twisted rods 16' are then sheathed in a cylindrical member 14' whose internal diameter is equal to diameter of the core rod 18 plus two times the diameter of the rods 16' so that the rods 16' are in physical contact with the external surface of the core rod 18 and the internal surface of the cylindrical member 14'. The external diameter of cylindrical member 14' is seleced so that an integral number of rods 16'' of the same diameter as rods 16' completely surround member 14' with their external surfaces in contact with each other. A second layer of rods or wires 16'' are also twisted about the external surface of the cylindrical member 14' and sheated in a second cylindrical member 14''. The twisted rods on the second layer are angularly disposed with regard to the core rod 18 at an angle β which may be the same as α or may be different as shown in FIG. 2. The internal diameter of the cylindrical member 14'' is selecetd so that the rods 16'' will be encased between and in contact with the external surface of member 14' and the internal surface of member 14''. The external diameter of member 14'' is again selected so that an integral number of rods 16'' of the same diameter as rods 16' will completely surround member 14 with their external surfaces in contact with the adjacent rods. In a like manner, the layer of rods 16'' will be sheathed in a cylindrical member 14''' and so on until the composite structure of rods and cylindrical members has a diameter equal to the diameter of the desired multiorifice structure 10. The composite structure is then fused or sintered to form an integral structure 22 in which each rod is fused to each adjacent rod and to the surfaces of the bounding cylindrical members 14.

To facilitate the fusion of the rods and the cylindrical members, the rods and cylindrical members may be coated with a thin layer of material having a lower melting temperature than the materials of the rods and cylindrical members, as shown in FIG. 5. This coating material may be deposited on the surface of the rods and cylindrical members by electroplating, dipping, vapor deposition or any other way known in the art. FIG. 5 is an enlarged section of the multiorifice structure in which the thickness of the coatings are exaggerated for illustrative purposes. Referring to FIG. 5, each rod 16 and cylindrical member 14 is coated with a thin layer of a material 24. For example, the rods 16 and cylindrical member may be made from a stainless or carbon steel and the coating material may be copper, nickel, tin, or any other suitable material having a lower melting temperature. It is recognized that the multiorifice structure need not be made from metals, and glass as well as plastic materials may be used. Further, it is not always necessary that both rods 16 and cylindrical members 14 be coated with the lower melting temperature material and alternatively, only one or other needs to be coated.

Referring now to FIG. 6, the fused assembly 22 is sliced or cut using any of the known methods to produce a plurality of thin multiorifice structures 10 having the desired thickness. The sliced surfaces 26 of the multiorifice structures may subsequently be ground or polished to produce required surface finish or uniformity of thickness.

Although the invention has been described and illustrated with reference to a particular configuration and method of manufacture, it is not contemplated that the invention be limited to the structure shown or the particular method of making discussed. It is recognized that those skilled in the art could conceive alternate embodiments wherein the cylindrical members could take alternate shapes or the single layer of rods be replaced by rods having noncircular cross-sections or even multiple layers of rods between the cylndrical members without departing from the spirit of the invention.

What is claimed is:

1. A method for making a multiorifice structure comprising the steps of:

twisting a first circular layer comprising a first integral number of parallel rods about a central rod to form a central structure having an axis of symmetry concentric with the axis of said central rod and the axes of said first layer of parallel rods being disposed at a first angle with respect to said axis of symmetry;

encasing said central structure with a first cylindrical member having an internal surface contacting the external surfaces of said first layer of rods and an external surface having a diameter selected to support a second integral number of rods about its periphery with the external surfaces of said second integral number rods in contact with each adjacent rod;

twisting a second circular layer comprising a second integral number of parallel rods about said first cylindrical member, the axes said second layer of rods being disposed at a second angle with respect to said axis of symmetry greater than said first angle;

encasing said second layer of rods with a second cylindrical member having an internal surface contacting the surfaces of said second layer or rods and an external surface having diameter selected to support a third integral number of rods about its periphery with the external surfaces of said third integral number or rods in contact with each adjacent rod;

adding alternating layers of parallel rods and cylindrical members to form a composite structure having a predetermined diameter, each succesive layer of rods twisted to have their axes disposed at a greater angle with respect to said axis of symmetry than the preceding layer;

heating said composite structure to a temperature sufficient to cause said layers of parallel rods and cylindrical members to fuse into an integral assembly; and slicing said fused integral assembly in a direction normal to said axis of symmetry to produce a plurality of wafers, each wafer having a multiplicity of orifices formed by the interstices between said fused rods and said cylindrical members.

2. The method of claim 1 wherein said step of heating, heats the composite structure to a temperature sufficient to cause said rods and said cylinder members to sinter.

3. The method of claim 1 wherein said rods and cylindrical members have known melting temperatures further including the step of coating at least said rods with a thin layer of a material having a lower melting temperature than the material of said rods and said cylindrical members; and wherein said step of heating, heats the composite structure to a temperature intermediate the melting temperature of said thin layer and the melting temperature of said rods to cause said thin layer to fuse said rods and cylindrical members into said integral structure.

4. The method of claim 1 wherein said rods and cylindrical members have known melting temperatures further including the step of coating at least the internal and external surfaces of said cylindrical members with a thin layer of material having a lower melting temperature than the material of said rods and said cylindrical members; and wherein said step of heating, heats the composite structure to a temperature intermediate the melting temperature of said thin layer and the melting temperature of said rods and cylindrical members to fuse said rods and said cylindrical members into said integral structure.

5. The method of claim 4 wherein said step of coating further includes the step of coating said rods with a thin layer of said same material having a lower melting temperature.

* * * * *